United States Patent [19]

Newman

[11] Patent Number: 4,884,340

[45] Date of Patent: Dec. 5, 1989

[54] CHAIN SAW ATTACHMENT FOR LAWN TRIMMER

[76] Inventor: Paul K. Newman, 1914 S. Suncoast Blvd., Homosassa, Fla. 32646

[21] Appl. No.: 305,952

[22] Filed: Feb. 2, 1989

[51] Int. Cl.$^4$ .................... A01D 35/26; A01D 50/00
[52] U.S. Cl. .................................. 30/122; 30/123.4; 30/383
[58] Field of Search .............. 30/122, 123.4, 123, 30/381–387, 276, 500

[56] References Cited

U.S. PATENT DOCUMENTS

| | | | |
|---|---|---|---|
| 2,391,730 | 12/1945 | Melvin et al. | 30/123.4 |
| 2,765,823 | 10/1956 | Kneifl | 30/123.4 |
| 2,810,409 | 10/1957 | Ibelle et al. | 30/122 |
| 4,122,601 | 10/1978 | Katsuya | 30/296 |
| 4,188,719 | 2/1980 | Hoff | 30/122 |
| 4,242,794 | 1/1981 | Peterson | 30/122 |
| 4,501,332 | 2/1985 | Straayer | 172/141 |
| 4,654,971 | 4/1987 | Fettes et al. | 30/383 |
| 4,752,256 | 6/1988 | Dorion | 440/49 |
| 4,760,646 | 8/1988 | Siegler | 30/382 |

OTHER PUBLICATIONS

Technic Tool Corp., Information on Power Pruner (publication date unknown).
Lawn, Garden & Power Equipment Owner's Manual, published by Technical Publications, p. 41, Intertec Publishing Corporation, Overland Park, KS 66212.

Primary Examiner—Douglas D. Watts
Attorney, Agent, or Firm—Warren L. Franz

[57] ABSTRACT

An attachment for converting a conventional lawn trimmer for chain saw use has a ninety-degree adapter housing to removably mount a chain bar in axial alignment on the cutting head end of the trimmer frame. A bevel gear train connects the trimmer motor drive shaft to a sprocket for driving the chain, and an oil reservoir and thumb-operated pump mount to the frame to deliver lubrication to the chain during sawing.

20 Claims, 2 Drawing Sheets

CHAIN SAW ATTACHMENT FOR LAWN TRIMMER

This invention relates to an attachment for converting a conventional vegetation cutting and trimming apparatus for use as a chain saw.

BACKGROUND OF THE INVENTION

Hand-held portable lawn trimmers for cutting and trimming vegetation are well known. Such devices may be of the gas or electric motor type, with the gas motor type typically comprising a compact internal combustion motor mounted at one end of an elongated hollow tubular frame member or tubing which carries at its opposite end a cutting tool operatively connected to the motor by means of a drive shaft received within the tubing. A handle is mounted to the tubing at its motor end along with motor control means, such as a trigger switch, for convenient manual manipulation and control of the tool. The electrical motor type is similarly configured except that for lightweight models the electric motor may be mounted adjacent the cutter end with electrical wiring running through the tubing from the handle.

Such devices are commonly referred to as "lawn trimmers." Heavy duty versions are usually of the gas motor type so that they can be used almost anywhere that an operator can walk, without limitation of an electrical cord length restriction. Such versions are often supported by a harness worn by the user that clips to a ring in the vicinity of the handle.

The cutting tool is usually a cutting head having one or more flexible strings as of monofilament nylon line disposed on a rotating drum, operatively connected through a gear drive to the drive shaft and fastened by a securing means to the elongated frame member. On electric trimmers, the cutting head may be attached directly to the output shaft of a motor that is mounted at the lower end of the machine. Such a head operates to "whip" the contacted vegetation with the spinning monofilament line to break the same off rather than actually cutting it.

On some trimmers, the monofilament head is replaceable with a circular metal or hard plastic rotary cutting blade useful for cutting tall, tough weeds and small shrubs. It is also known to replace the head with a reciprocating cutting blade, such as shown in FIG. 1b of U.S. Pat. No. 4,122,601, for use in pruning soft trees like palm and fruit trees. The '601 patent shows a trimmer with a multisectioned tubular frame member of sufficient length to provide a reach of approximately 2 meters in order to facilitate the pruning of tall trees.

In addition to being known to substitute rotary and reciprocating cutter blades for a monofilament head, it is also known to convert conventional lawn trimmers into devices that perform noncutting functions by replacing the head with a conversion attachment. For example, U.S. Pat. No. 4,242,794 describes a blower attachment for converting the trimmer into a blower for removing leaves and grass clippings from sidewalks or other surfaces. U.S. Pat. No. 4,501,332, and page 41 of the *Lawn, Garden & Power Equipment Owner's Manual*, published by Technical Publications, Intertec Publishing Corporation, Overland Park, Kans. disclose attachments for converting such apparatus into various earth cultivating devices. And, a conversion device is also known for converting a conventional trimmer into a screw propeller boat propulsion device, as described in U.S. Pat. No. 4,752,256.

SUMMARY OF THE INVENTION

It is an object of the present invention to provide an attachment for converting a conventional apparatus for cutting and trimming vegetation into a chain saw.

The conversion in accordance with the invention is accomplished by providing a chain bar, an adapter housing serving to removably secure the chain bar in a desired orientation in place of the usual cutter head on the tool end of the tubular frame member of a conventional trimmer, and gear means for operative attachment to the driving mechanism of the trimmer for powering a saw chain mounted on the chain bar. Means is also provided in removable attachment to the trimmer for delivering oil lubrication during sawing operations to the chain.

A preferred embodiment of the invention, described in greater detail below, provides a chain bar in removable attachment in place of the cutter head at the cutting tool end of the elongated tubing frame of a heavy duty, gasoline-powered lawn trimmer. The chain bar is oriented with its longitudinal axis located in the same plane as, and preferably parallel with, the axis of the tubing. A pair of meshing, perpendicularly disposed bevel gears connect a conventional tubing enclosed input drive shaft to an arbor shaft mounted sprocket for driving the saw chain around the bar. A preferred lubrication means comprises a manually, thumb-operated pump mounted on the tubing frame convenient to a trigger switch motor control, and conduit means connected to the pump for delivering oil from a frame-mounted reservoir to the chain bar running groove.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DESCRIPTION OF THE PREFERRED EMBODIMENTS

Figure 1:
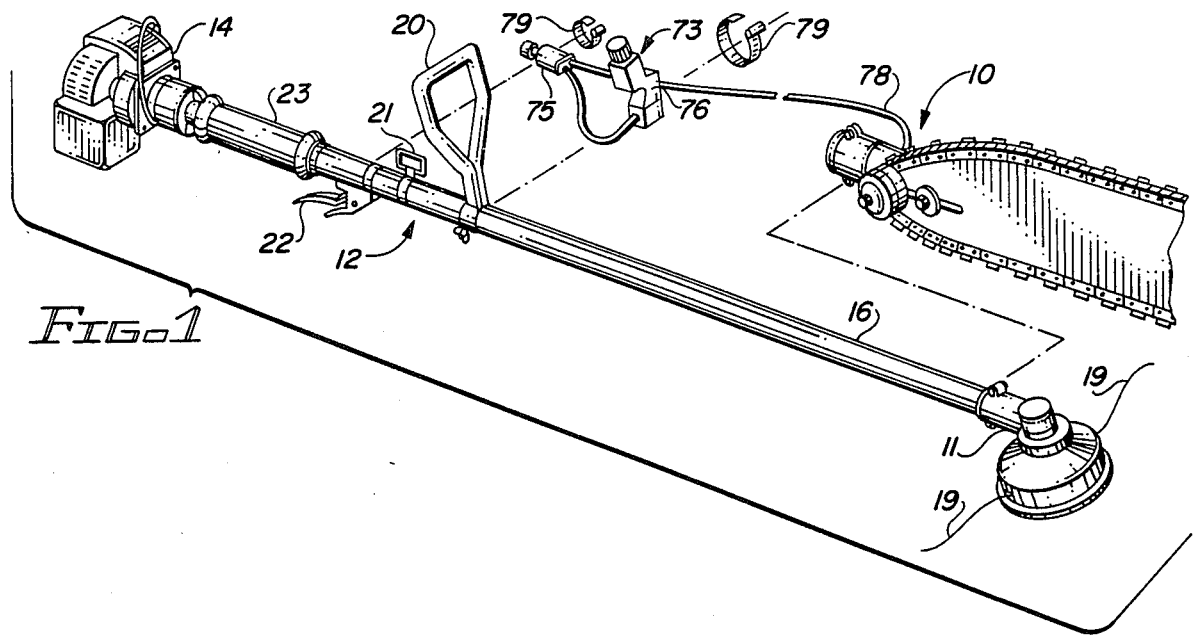
FIG. 1 is a perspective view of a chain saw attachment in accordance with the invention, shown for substitution for a cutter head adjacent a conventional gas-powered lawn trimmer.

The principles of the invention are illustrated, by way of example, embodied in the form of a chain saw attachment 10 configured for mounting in place of a cutting head 11 of a conventional heavy-duty, gas-powered lawn trimmer 12 shown in FIG. 1. The trimmer 12 comprises an internal combustion motor 14 secured at one end of an elongated hollow tubular frame member 16 containing an elongated, motor-driven drive shaft 18 (see FIG. 5). At an opposite end of the tubing 16 is mounted a cutting tool having monofilament nylon strings 19 received thereon for rotation through a normal gearing mechanism (not shown) by the drive shaft 18.

A handle 20 mounted on the tubing 16 adjacent its motor end provides means for manual manipulation of the tool, and a ring 21 intermediate the motor 14 and the handle 20 serves for attachment of a trimmer weight-supporting user harness (not shown). Control for operating the cutting head 11 under power by the motor 14 is provided by a trigger switch 22 conveniently positioned ahead of a rubber grip 23 on the tubing 16.

The arrangement of the conventional cutting head 11 and trimmer 12 depicted in FIG. 1 is typical of prior art structures like those represented, for example, by the commercially available Shingo Model 180 trimmer. The cutting head 11 is removable from the tubular frame member 16 and the drive shaft 18 by loosening bolts or similar fasteners which hold a split coupling end of the head 11 onto the tubing 16. The chain saw attachment 10 is configured to substitute for the removed cutting head 11.

Details of the exemplary chain saw attachment 10 are illustrated in FIGS. 2-5. A coupling 24 comprising a right-angled tubular housing 26 with a split input end provides means to releasably secure the attachment 10 by means of fasteners passing through bores 27 to the cutter end of the tubing 16 in place of the conventional cutter head 11 which is removed.

Figure 5:
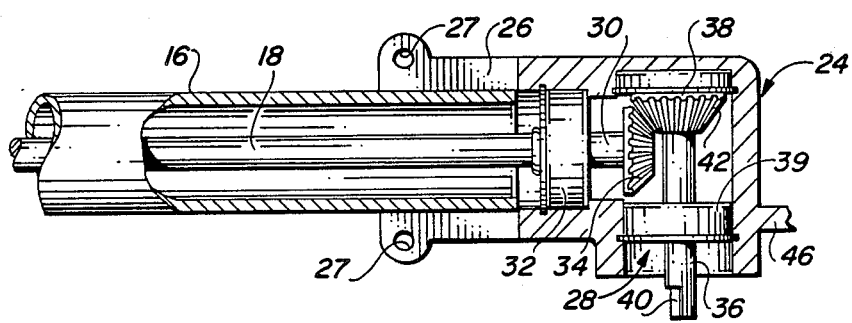
FIG. 5 is a longitudinal section view of the adapter housing portion of the attachment of FIG. 1, shown in trimmer-mounted position.

A gear train 28, positioned internally within housing 26, has an input shaft 30 which is brought coaxially into mating relationship onto the end of drive shaft 18, when the input end of the housing 26 is brought circumferentially over the bottom of the tubular frame 16 (see FIG. 5). The shaft 30 is centrally located within the interior of the housing 26 by passing through a bearing 32 and has fixed at its internal end, as an internal extension thereof, a first bevel gear 34 for rotation with the input shaft 30 (and, thus, the drive shaft 18) about the axis of the tubing 16. An arbor or output shaft 36 is similarly located by means of axially-spaced bearings 38 and 39 centrally for rotation within the interior of the output end of housing 26, at right angles to the shaft 30. The shaft 36 has a free, external end 40 which includes a square cross-section, splines, matching threads or other mechanism for positive engagement with a saw chain driving mechanism, described below. The opposite end of the shaft 36 includes a second bevel gear 42 positioned to mesh cooperatively with the perpendicularly disposed first bevel gear 34.

Figure 2:
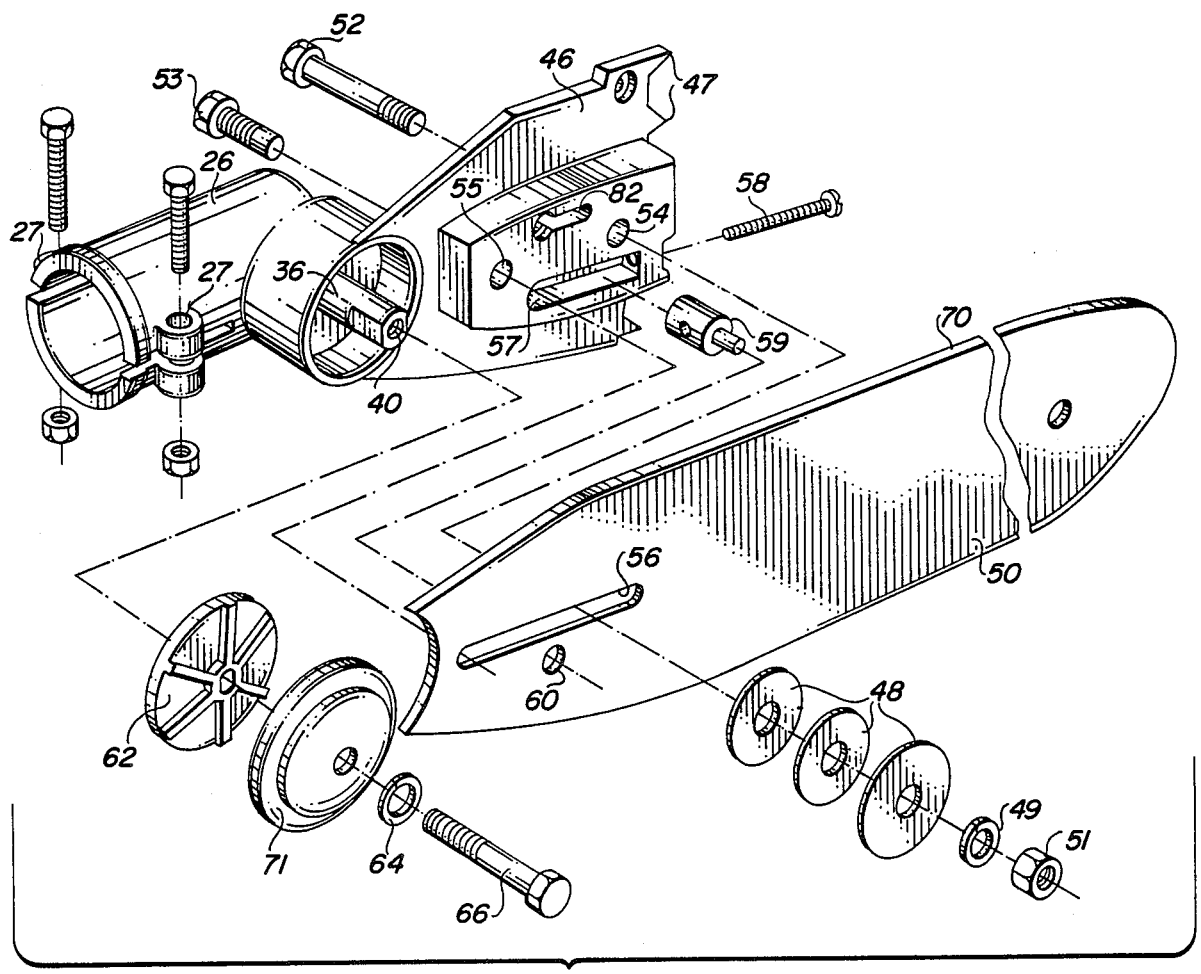
FIG. 2 is an enlarged, exploded view showing the front of the chain saw attachment of FIG. 1.
Figure 3:
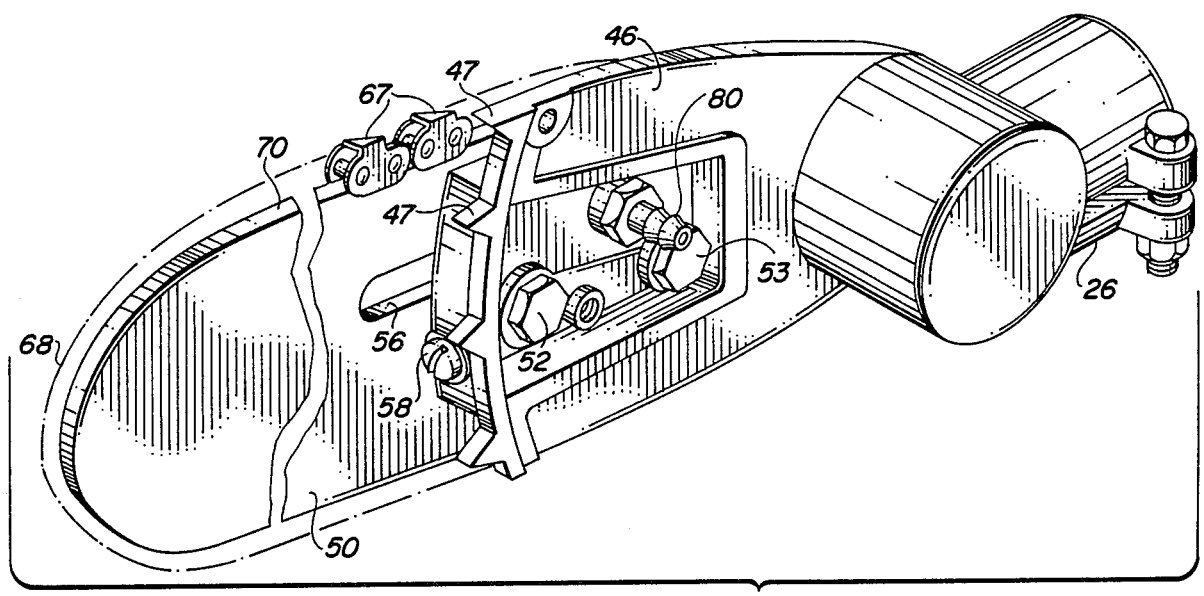
FIG. 3 is perspective view showing the rear of the attachment of FIG. 1.

As shown in FIGS. 2 and 3, a planar bar protector plate 46 is mounted adjacent the output end of the housing 26 and may be formed, if desired, as an integral part of the housing 26. The plate 46 preferably extends parallel to the axis of the input shaft 30, and is thus brought parallely into position relative to the axis of the tubing 16. One or more bumper spikes 47 may be provided at the forward edge of the plate 46 for use in conventional chain saw bumper spike fashion. A planar chain guide bar 50 is brought into superposed parallel relationship flush against the plate 46, and is mounted thereto in known chain saw bar mounting fashion by means of a bar bolt 52 and bar pin 53 which are brought through apertures 54 and 55, respectively, in plate 46 and elongated axial aperture 56 of bar 50. Bolt 52 is secured by means of washers 48, 49 and nut 51. Pin 53 is secured only at bore 55, with its free end projecting unsecured through channel 56 to serve for aligning the bar 50 relative to the plate 46 in known way. The insertable pin 53 shown in FIGS. 2 and 3 may, of course, alternatively take the form of a fixed pin (not shown) integrally formed to project from the plate 46, if desired. A chain tensioning mechanism may be incorporated in known manner within a hollow 57 in the plate 46, with an adjustment screw 58 that coacts with a tensioning pin 59 which passes through a hole 60 within the tail of the bar 50. The chain tensioning mechanism serves to insure that the chain is snug around the nose and sides of the bar 50.

A chain drive sprocket 62 connects for positive drive onto the end 40 of the output shaft 36 of the gear train 28 of coupling 24 (see FIG. 5). The sprocket 62 is fastened to shaft 36 by means of a washer 64 and a bolt 66, and is configured to match the end of the shaft 36 for positive drive so that, as the sprocket 62 turns, it will engage the drive links 67 (FIG. 3) of a cutting chain 68 positioned perimetrically of the bar 50 to travel within a running groove 70, so as to move the chain 68 forward around the bar 50 which is bolted to the plate 46. A disc 71 is provided intermediate the sprocket 62 and the washer 64 for the purpose of retaining the open loop of the chain 68 which goes over the sprocket 62 at the tail of the bar 50. A sprocket cover (not shown) may, optionally, be brought over the disc 71 and front of the tail of the bar 50 to cover the sprocket and other parts of the connection.

The gears 34 and 42 of the train 28 (FIG. 5) are selected to provide the desired turning speed for the chain, which may be different than the normal trimmer drive shaft turn speed, depending on the trimmer. A typical desired chain saw speed is approximately fifty feet per second. The guide bar 50 should, in conventional manner, be constructed of a material such as steel that will withstand the heat of the chain friction as it moves around the bar 50 and also the heat that builds up in the wood behind the cut.

All chain saws employ some kind of oil dispensing system for lubricating the bar and chain to prevent chain burn-up. At cutting chain speeds of fifty feet per second, the chain must endure several sources of extreme resistance with resulting friction, heat and wear. The chain 68 runs in continuous contact with the edges of the groove 70 of the bar 50; the moving parts of the chain go against each other; and the chain bites into the wood as it cuts.

Figure 4:
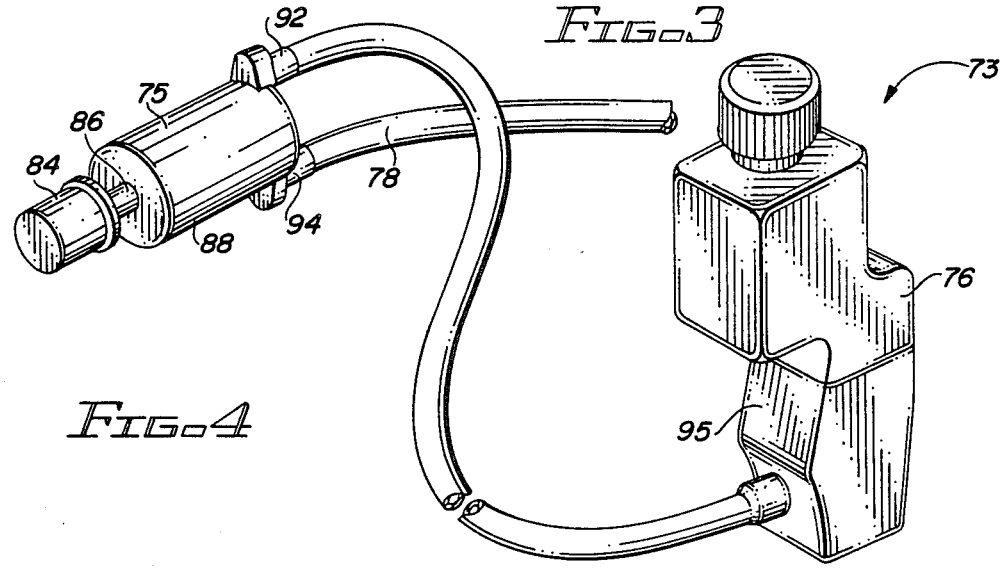
FIG. 4 ia a perspective view showing the lubrication means of FIG. 1.

In accordance with the invention, a lubricating system 73 is provided for shooting oil in controlled amounts through an opening (not visible) of the bar 50 into the groove 70 and onto the chain 68 itself. As shown in FIGS. 1 and 4, the lubrication means 73 may comprise a manually controlled system, having a thumb-operated pump 75 that draws oil from a reservoir 76 and delivers the same via a hose conduit 78 running the length of the frame 16 to a hose end fitting 80 (FIG. 3) connecting to an oil inlet hole 82 in the plate 46, for communicating the pumped oil to an oppositely positioned hole (not visible) located above the aperture 56 in the tail of bar 50, and from there through to the opening in the groove 70.

As shown in FIG. 4, the pump 74 may have a thumb-operable push button 84 located at an outer end of a push rod 86 which moves a plunger (not visible) inside a cast unit 88 against the biasing action of a spring (not visible), to exert pressure to draw oil from the oil reservoir tank 76 through an intake check valve 92 to a discharge check valve 94 and into the oil line 78 that leads to the fitting 80 (FIG. 3) and oil discharge hole 82 (FIG. 2) near the mounting area of the guide bar 50.

As shown, the reservoir 76 may be shaped with a central recess 95 through which the tubing frame 16 can transversely extend for placement of the reservoir 76 along the tubing 16 at a position as suggested in FIG. 1. The pump 75 is likewise placed along the tubing 16; however, in a position for convenient thumb manipulation adjacent the trigger switch 22. Removable connection of the reservoir 76, pump 75 and conduit 78 components of the lubrication system 73 onto the frame 16 may be made as by tie fasteners, Velcro TM-type hook and eye fasteners, or similar releasable means 79.

It will be appreciated by those skilled in the art to which the invention relates that the foregoing detailed description is intended to be merely exemplary and not exclusive. In particular, it will be appreciated that the attachment may be modified to assume a different angle of the chain bar relative to the tubular frame 16 and further that the same may be adapted for use with an electric trimmer having the motor located at the cutting tool end. Moreover, those so skilled will appreciate that various other substitutions and modifications may be made to the described embodiments without departing from the spirit and scope of the invention as defined by the claims below.

What is claimed is:

1. An attachment for converting a conventional hand-held portable apparatus for cutting and trimming vegetation into a chain saw, said apparatus comprising:
   an elongated tubular frame member;
   a motor carried at an end of said frame member;
   a drive shaft connected to said motor;
   a cutting tool removably secured to an end of said frame member; and
   means operatively connecting said cutting tool removably to said drive shaft to be driven by said motor;
   and said attachment comprising:
   an elongated, planar chain bar having a peripheral groove for receiving and guiding a saw chain therearound;
   an adapter housing having an input end dimensioned and configured for removably securing said housing to said frame member in place of said cutting tool, and an output end;
   means mounting said chain bar adjacent said output end of said housing;
   a chain drive sprocket;
   means rotatably mounting said sprocket at said output end of said adapter housing adjacent said chain bar for operative connection removably to said drive shaft for driving said saw chain around said bar by said motor under guidance of said groove;
   an oil reservoir;
   conduit means for delivering oil from said reservoir to said chain bar for lubricating said chain as said chain is driven around said bar; and
   means for releasably securing said oil reservoir and said conduit means to said apparatus.

2. An attachment as in claim 1, wherein said chain bar mounting means comprises a planar bar protector plate mounted adjacent the output end of said housing; and means mounting a tail portion of said chain bar flush against said plate.

3. An attachment as in claim 2, wherein said tail portion of said chain bar has a longitudinal aperture therein, and wherein said tail portion mounting means comprises bolt and bar alignment means passing from said plate through said longitudinal aperture.

4. An attachment as in claim 3, wherein said tail portion further has a hole therethrough, and further comprising a chain tensioning mechanism passing through said hole and cooperating with said plate and said bar to permit the selective longitudinal displacement of said bar relative to said plate when said tail bolt and bar alignment means is loosened.

5. An attachment as in claim 4, wherein said plate is formed with a plurality of bumper spikes projecting in laterally spaced positions at a leading edge of said plate alongside said bar.

6. An attachment as in claim 5, wherein said plate has an oil dispensing opening therethrough, said bar has a passage therein having an opening opposite said oil dispensing opening and an opening into said groove, and wherein said conduit means further comprises a hose fitting connected to said plate at said oil dispensing opening and a hose connecting said reservoir to said hose fitting.

7. An attachment as in claim 6, wherein said conduit means further comprises manually operable pump means cooperatively connected with said reservoir and said hose for selectively pumping oil from said reservoir to said fitting through said hose.

8. An attachment as in claim 7 for converting apparatus having a trigger switch mounted on said frame member for controlling said driving of said drive shaft by said motor, and wherein said means for securing said reservoir and conduit means to said apparatus includes means for releasably securing said pump means on said frame member adjacent said trigger switch.

9. An attachment as in claim 8, wherein said means mounting said chain bar comprises means for mounting said chain bar in general axial alignment with said frame member.

10. An attachment as in claim 9, wherein said input end of said housing is oriented perpendicularly to said output end of said housing.

11. An attachment as in claim 10, wherein said means rotatably mounting said sprocket comprises a bevel gear train having an input shaft and an output shaft, means for operatively connecting said input shaft for rotation by said drive shaft, and means connecting said sprocket to said output shaft.

12. A method for converting a conventional hand-held portable apparatus for cutting and trimming vegetation into a chain saw, said apparatus comprising:
   an elongated tubular frame member;
   a motor carried at an end of said frame member;
   a drive shaft connected to said motor;
   a cutting tool secured to an end of said frame member; and
   means operatively connecting said cutting tool to said drive shaft to be driven by said motor;
   said method comprising the steps of:
   removing said cutting tool from said frame member and from said operative connection to said drive shaft;
   securing to said frame member, in place of said cutting tool, an attachment including an elongated planar chain bar having a peripheral groove for receiving and guiding a saw chain therearound, and further including a chain drive sprocket rotatably mounted adjacent to said chain bar; said sprocket being brought into operative connection to said drive shaft for driving said saw chain around said bar by said motor under guidance of said groove; and securing to said frame member an oil reservoir and conduit means for delivering oil from said reservoir to said chain bar for lubricating said chain as said chain is driven around said bar.

13. A method as in claim 12, wherein said chain bar securing step comprises securing said chain bar in general axial alignment to said frame member.

14. A method as in claim 12, for converting apparatus further having a trigger switch mounted on said frame member for controlling said driving of said drive shaft by said motor, wherein said conduit means securing step further comprises securing a manually operable pump on said frame member adjacent said trigger switch for selectively pumping oil from said reservoir to said chain bar through said conduit means.

15. In combination with a conventional hand-held portable apparatus for cutting and trimming vegetation, said apparatus comprising:
 an elongated tubular frame member;
 a motor carried at an end of said frame member;
 a drive shaft connected to said motor;
 a cutting tool removably secured to an end of said frame member; and
 means operatively connecting said cutting tool removably to said drive shaft to be driven by said motor;
 an attachment comprising:
 an elongated, planar chain bar having a peripheral groove for receiving and guiding a saw chain therearound;
 an adapter housing having an input end secured to said cutting tool end of said frame member in place of said cutting tool, and an output end;
 means mounting said chain bar adjacent said output end of said housing;
 a chain drive sprocket;
 means rotatably mounting said sprocket at said output end of said adapter housing adjacent said chain bar and in operative connection to said drive shaft for driving said saw chain around said bar by said motor under guidance of said groove;
 an oil reservoir;
 conduit means for delivering oil from said reservoir to said chain bar for lubricating said chain as said chain is driven around said bar; and
 means securing said oil reservoir and said conduit means to said apparatus.

16. A combination as in claim 15, wherein said chain bar has a tail portion including a longitudinal aperture therein; and wherein said chain bar mounting means comprises a planar bar protector plate mounted adjacent the output end of said housing, and bolt and bar alignment means passing from said plate through said longitudinal aperture mounting said tail portion of said chain bar in parallel orientation against said plate.

17. A combination as in claim 16, wherein said apparatus is a gas-powered apparatus, said motor is a compact internal combustion motor carried at one end of said frame member, said frame member is a hollow tubing, said drive shaft is disposed through said hollow tubing, and said adapter housing input end is secured to an opposite end of said frame member.

18. A combination as in claim 17, wherein said apparatus further comprises a trigger switch mounted on said frame member adjacent said motor end for controlling said driving of said drive shaft by said internal combustion motor, and said conduit means further comprises manually operable pump means disposed on said frame member adjacent said trigger switch for selectively pumping oil from said reservoir to said chain bar through said conduit means.

19. A combination as in claim 18, wherein said means mounting said chain bar comprises means mounting said chain bar in general axial alignment with said hollow tubing.

20. A combination as in claim 19, wherein said input end of said housing is oriented perpendicularly to said output end of said housing.

* * * * *